US010425479B2

(12) United States Patent
Smith

(10) Patent No.: US 10,425,479 B2
(45) Date of Patent: Sep. 24, 2019

(54) SAVING VIDEO CLIPS ON A STORAGE OF LIMITED SIZE BASED ON PRIORITY

(71) Applicant: Vivint, Inc., Provo, UT (US)

(72) Inventor: Rodney David Smith, Draper, UT (US)

(73) Assignee: Vivint, Inc., Provo, UT (US)

( * ) Notice: Subject to any disclaimer, the term of this patent is extended or adjusted under 35 U.S.C. 154(b) by 394 days.

(21) Appl. No.: 14/261,256

(22) Filed: Apr. 24, 2014

(65) Prior Publication Data

US 2015/0312341 A1    Oct. 29, 2015

(51) Int. Cl.
*H04L 29/08* (2006.01)
*G06F 16/78* (2019.01)
*H04N 5/781* (2006.01)
*H04N 21/433* (2011.01)
*H04N 21/4335* (2011.01)
*G06F 16/738* (2019.01)
*G08B 13/196* (2006.01)

(52) U.S. Cl.
CPC ........ *H04L 67/1097* (2013.01); *G06F 16/739* (2019.01); *G06F 16/7867* (2019.01); *H04N 5/781* (2013.01); *H04N 21/4334* (2013.01); *H04N 21/4335* (2013.01); *G08B 13/19665* (2013.01)

(58) Field of Classification Search
CPC .......... G06F 17/30843; H04N 21/4335; H04N 7/181; H04N 7/183; H04N 7/188; H04N 21/4223; H04N 5/147; H04N 21/2187; H04N 21/231; H04N 21/4622; H04N 21/47202; H04N 5/445; H04N 21/4263; H04N 21/4131; G06K 2009/00738; G06K 9/00711; G06K 9/00342; G06K 9/00013; G08B 25/008; G08B 13/196; G08B 13/19645; G08B 13/19676; G08B 13/19602; G11B 31/006; G05B 2219/2628; H04L 12/2825
See application file for complete search history.

(56) References Cited

U.S. PATENT DOCUMENTS

| 8,350,694 | B1 |  | 1/2013 | Trundle et al. |
| 9,979,924 | B1 | * | 5/2018 | Fink ........................ H04W 4/90 |
| 2004/0187159 | A1 |  | 9/2004 | Gaydos, Jr. et al. |
| 2005/0183123 | A1 | * | 8/2005 | Lee ....................... G11B 27/034 725/47 |
| 2005/0271251 | A1 | * | 12/2005 | Russell .............. G06K 9/00288 382/103 |

(Continued)

OTHER PUBLICATIONS

International Search Report for PCT/US2015/024842, dated Jun. 17, 2015.

*Primary Examiner* — Sargon N Nano
(74) *Attorney, Agent, or Firm* — Holland & Hart LLP

(57) ABSTRACT

Methods and systems are described for storing video content collected by a home automation system. According to at least one embodiment, an apparatus for accessing video content collected by a home automation system includes a processor, a memory in electronic communication with the processor, and instructions stored in the memory which are executable by a processor to receive video content associated with an event, determine a priority level of the video content based on at least one predetermined criteria, and store the video content for a period of time based on the priority level.

19 Claims, 12 Drawing Sheets

(56) References Cited

U.S. PATENT DOCUMENTS

| | | | | |
|---|---|---|---|---|
| 2008/0184245 A1* | 7/2008 | St-Jean | ............ | G06K 9/00771 |
| | | | | 718/103 |
| 2008/0261605 A1* | 10/2008 | Larsen | ................ | H04L 29/06 |
| | | | | 455/446 |
| 2009/0249428 A1* | 10/2009 | White | ............ | H04L 12/2809 |
| | | | | 725/133 |
| 2010/0007731 A1* | 1/2010 | Joseph | ............ | G08B 13/19667 |
| | | | | 348/143 |
| 2010/0208064 A1* | 8/2010 | Liu | ................ | G08B 13/19667 |
| | | | | 348/143 |
| 2011/0030016 A1* | 2/2011 | Pino, Jr. | ............ | H04L 12/2818 |
| | | | | 725/80 |
| 2012/0113253 A1* | 5/2012 | Slater | ................ | H04N 7/185 |
| | | | | 348/143 |
| 2012/0288259 A1 | 11/2012 | Gilson | | |
| 2013/0121527 A1 | 5/2013 | Chambers et al. | | |
| 2013/0215266 A1* | 8/2013 | Trundle | ............ | G08B 13/19602 |
| | | | | 348/143 |
| 2014/0071290 A1* | 3/2014 | Collen | ................ | H04N 9/79 |
| | | | | 348/159 |
| 2014/0250132 A1* | 9/2014 | Pollak | ............ | G06F 17/30058 |
| | | | | 707/748 |
| 2015/0097961 A1* | 4/2015 | Ure | ................ | G08B 5/223 |
| | | | | 348/159 |
| 2015/0163412 A1* | 6/2015 | Holley | ................ | G05B 15/02 |
| | | | | 348/143 |
| 2015/0163535 A1* | 6/2015 | McCarthy, III | .... | G07C 9/00571 |
| | | | | 725/49 |

* cited by examiner

SAVING VIDEO CLIPS ON A STORAGE OF LIMITED SIZE BASED ON PRIORITY

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As home automation and security products expand to encompass other systems and functionality in the home, challenges exist in capturing and storing information about events being monitored by the home automation and security products.

SUMMARY

Methods and systems are described for storing video content collected by a home automation system. According to at least one embodiment, an apparatus for storing video content collected by a home automation system includes a processor, a memory in electronic communication with the processor, and instructions stored in the memory which are executable by a processor to receive video content associated with an event, determine a priority level of the video content based on at least one predetermined criteria, and store the video content for a period of time based on the priority level.

In one example, the instructions may be executable by the processor to store the video content in one of cloud storage and local storage. The instructions may be executable by the processor to identify the event based on at least one criteria, and collect video for a predetermined amount of time prior to and after the event is identified. The instructions may be executable by the processor to delete the video content at an end of the period of time. The period of time may range from less than 24 hours to permanent storage. The instructions may be executable by the processor to determine a storage location for the video content based at least in part on the priority level assigned to the video content. The instructions may be executable by the processor to permit a user to manually adjust the priority level before deleting the video content. The instructions may be executable by the processor to correlate the video content with other video content to confirm accuracy of determined priority level.

Another embodiment is directed to a computer-program product for storing video content collected by a home automation system. The computer-program product includes a non-transitory computer-readable medium storing instructions executable by a processor to receive video content, determine a priority level of the video content, associate the priority level with the video content, store the video content, and delete the video content after a predetermined time period based on the priority level.

In one example, receiving the video content may include receiving video content from a video camera. Determining a priority level of the video content may include determining whether the video content meets predetermined criteria. Storing the video content may include storing to one of a plurality of storage locations based on the priority level. Each storage location may have a different time period associated therewith for deleting the video content. The predetermined time period may include at least two different time periods.

A further embodiment relates to a computer-implemented method for storing video content collected by a home automation system. The method includes receiving video content associated with an event, the video content having an assigned priority level, storing the video content, and deleting the stored video content based on the priority level.

In one example, storing the video content may include storing in different locations based on the priority level. The method may include automatically assigning the priority level to the video content based on predetermined criteria. The method may include identifying an event, and creating a video clip of recorded video associated with the event, wherein the video content includes the video clip. Receiving video content may include receiving video content at a control panel of the home automation system. The event may include at least one of sensing motion, opening a barrier into a building structure, operating lighting, breaking glass, operating a garage door, and operating a home appliance.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
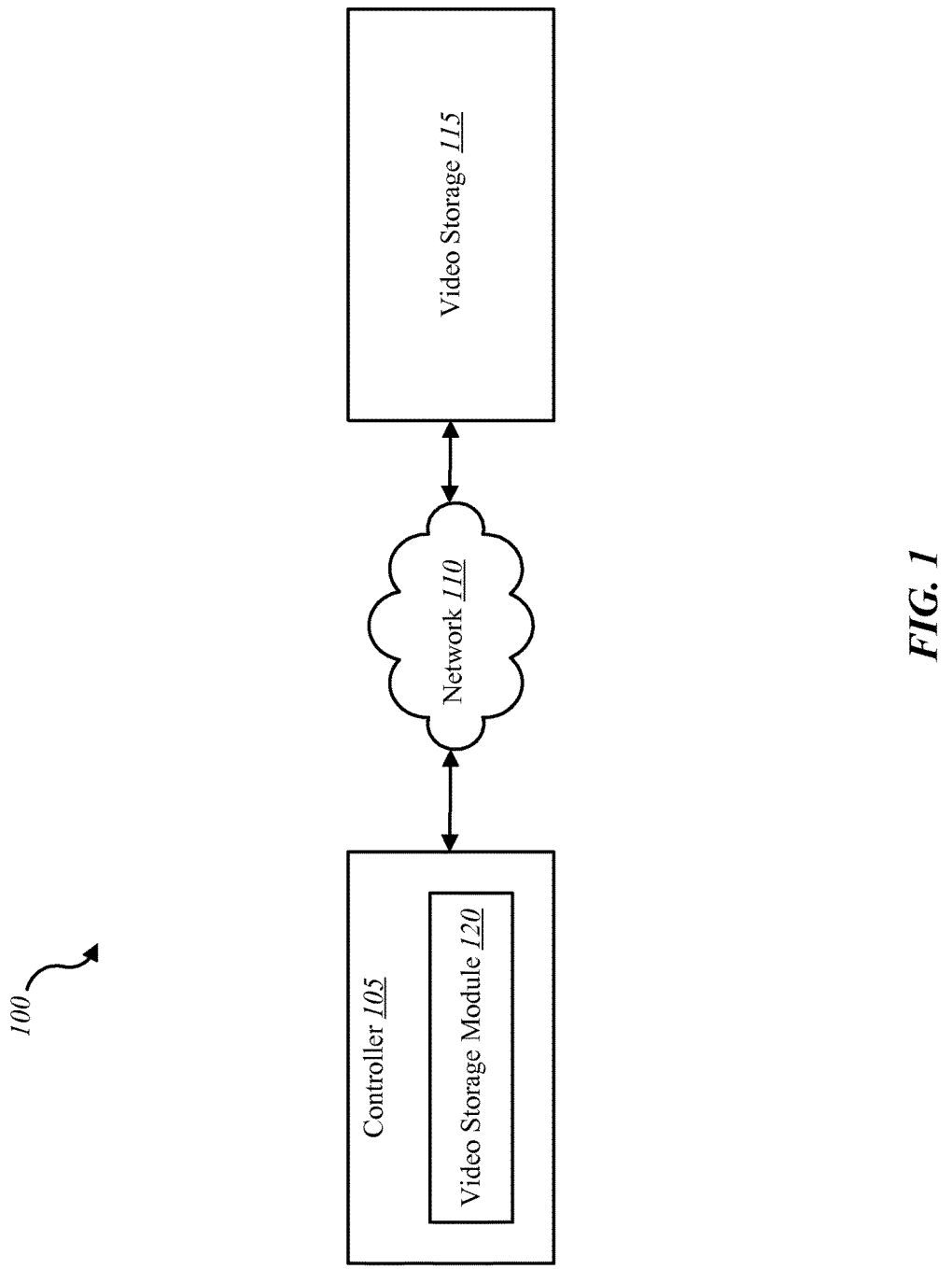
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to storing video content collected by a home automation system. As used herein, the phrase "home automation system" may refer to a system that includes automation features alone, security features alone, a combination of automation and security features, or a combination of automation, security and other features. While the phrase "home automation system" is used throughout to describe a system or components of a system or environment in which aspects of the present disclosure are described, such an automation system and its related features (whether automation and/or security features) may be generally applicable to other properties such as businesses and commercial properties as well as systems that are used in indoor and outdoor settings.

In many home automation systems, it is typical for video content collected by one or more cameras to be stored. The video content may be stored locally or remotely. Local storage may include storage in memory or a database of the home automation system at a location on the property being monitored by the home automation system. The local storage may be included as part of, for example, a camera device, control panel, desktop computer, or other electronic device on the premises of the property. Local storage may also include control panels or other electronic devices in close proximity to the property being monitored by the home automation system (e.g., control panels at homes in the same neighborhood or within a local network of home automation systems). A remote storage may include, for example, cloud storage, a control station, or a backend support system (e.g., server).

Storing video content may have limitations related to data transmission speeds and undesirable bandwidth occupation during transmission. Furthermore, the stored video content be difficult to access and/or may pose challenges related to finding specific information (e.g., a video clip associated with a particular event) that is included in the video data.

One aspect of the present disclosure is directed to systems and methods for reducing the total amount of video data (i.e., video content) for a home automation system. Another aspect of the present disclosure is directed to systems and methods for deleting and/or erasing stored video content based at least in part on the content of the video itself. Another aspect of the present disclosure relates to systems and methods for determining what video content should be stored based at least in part on certain rules or criteria related to the video content (e.g., an event that is captured at least in part by the video content). In general, the present disclosure is directed to systems and methods for saving important video footage (e.g., video clips) on a storage of limited size and/or minimizing the amount of video content to be stored while preserving important video content.

In at least some home automation systems, one or more video cameras may be continuously recording a viewable area of the video camera. The recorded video content may be stored, in part or in its entirety, locally or remotely. As noted above, storage of video content requires significant storage space. Furthermore, storing all recorded video footage poses challenges of finding relevant information in the video content among the vast amounts of non-relevant content. One option for addressing these challenges is to store only portions of a recorded video, such as only portions associated with an event. The event may include, for example, an unauthorized opening of a barrier to a house (e.g., a door or window). The home automation system may identify that portion of the recorded video that extends, for example, five seconds before and five seconds after the event, and store only that limited video content (e.g., video clip).

Furthermore, the home automation system may assign a priority indicator to the video content. The priority indicator may be stored along with the video content. In one example, the video content may be assigned a priority indicator as a numerical number between 1 and 4, wherein a priority indicator of 1 is of least importance and a priority indicator of 4 is the most important. Each priority indicator may have assigned thereto a rule, criteria, or condition, which assists in automated handling of the video content (e.g., conditions for storing and/or later erasing the video content).

In one example, a priority indicator of 1 provides for storage of the video content in a general sector of a data storage device and will automatically be deleted after 24 hours, or will be automatically deleted based on the storage capacity of the data storage device (i.e., automatic deletion when a capacity and/or quota of the data storage device is reached regardless of how long the video content has been stored at that location). A priority indicator of 3 may also be stored in the general sector of the data storage device and be automatically erased after one month, or after a different storage capacity of the data storage device is reached. A priority indicator of 4 may be stored in a separate sector of the data storage device and be permanently saved (i.e., saved until manually deleted by a user).

The assignment of priority indicators to video content may be performed automatically or manually. In the example of automatic assignment of a priority indicator, the priority indicator may be assigned based on the detected event. The event may include, for example, opening of a building barrier, operation of an appliance, operation of lighting, operation of HVAC, motion detection, or any other function or sensed activity. The time of day or day of week an event occurs may influence the assigned priority indicator. For example, an event of opening a front door during the hours of 3:00 to 4:00 p.m. on a weekday may be assigned a low priority indicator because it is known that such an event is typically associated with a child returning home from school and is authorized. However, an event of opening of the same door between the hours of 12:00 a.m. and 4:00 a.m. may be assigned a high priority indicator because such an event is typically unauthorized and may be associated with a crime.

Manual assignment of priority indicators may be performed at a later time after one or more video contents associated with particular events have been collected and made available for review by an operator. The operator may review the video content and assign priority indicators based on the video content of each clip. The operator may also manually store the video content at particular locations on one or more data storage devices, wherein each storage location may have associated therewith an automatic time period established for erasing the video content. Manually storing the video content in this way may be used in place of or in addition to assigning a priority indicator to the video content.

FIG. 1 is a block diagram illustrating one embodiment of an environment 100 in which the present systems and methods may be implement. In some embodiments, the systems and methods described herein may be performed, at least in part, using a controller 105. Controller 105 may be in communication with a video storage 115 via a network 110. Controller 105 may include a video storage module 120, or video storage module 120 may be operated at least in part using controller 105.

Controller 105 may include, for example, a processor, logic, or other functionality to assist in operating video storage module 120. Although controller 105 and video storage 115 are shown as separate devices in communication with each other via network 110, other embodiments may provide controller 105 and video storage 115 integrated into a single device that is consolidated at a single location.

Video storage module 120 may receive video content. In at least some arrangements, the video content includes video associated with one or more events. The events may be determined, at least in part, based on sensor feedback from one or more sensors of a home automation system. The home automation system may be part of or embodied in environment 100.

Video storage module 120 may operate to provide storage of the video content on video storage 115. Video storage 115 may include one or a plurality of storage locations for the video content. The video content may be stored at a location in video storage 115 based at least in part on one or more events or other data associated with the video content. Video storage 115 may include local storage, remote storage, or a combination of local and remote storage.

Video storage module 120 may assign a priority indicator or otherwise rate or rank the video content based at least in part on the type of event captured in the video content and/or any number of rules or criteria which help classify a level of importance for any given event. Video storage module 120 may store the video content on video storage 115 based at least in part on the priority indicator assigned to the video content.

The video content may be stored for a period of time that is based at least in part on the assigned priority indicator or the location wherein the video content is stored on video storage 115. For example, lower priority video content may be automatically erased or deleted within a short period of time (e.g., one hour, one day etc.). Higher priority video content may be stored for longer periods of time (e.g., two days, one week, one month, etc.), or may be prevented from being deleted (e.g., permanent storage). As will be described in further detail below, video storage 115 may be partitioned into different portions or sectors with preset storage time limits that may have stored therein video content with certain priority indicators.

Additionally, or alternatively, the video content may be stored on video storage 115 for as long as there is storage space available. Once the storage space on video storage 115 has reached capacity (deemed full under any criteria) or a quota amount, at least some of the video content stored thereon may be automatically deleted. The order in which video content is deleted may be based on a "first-in-first-out" basis, wherein the oldest stored video content is deleted in successive order. Additionally, or alternatively, a process may be employed in which lower priority video content is first deleted upon reaching the storage limit/quota in order to bring the storage system under the quota/storage limit.

Figure 2:
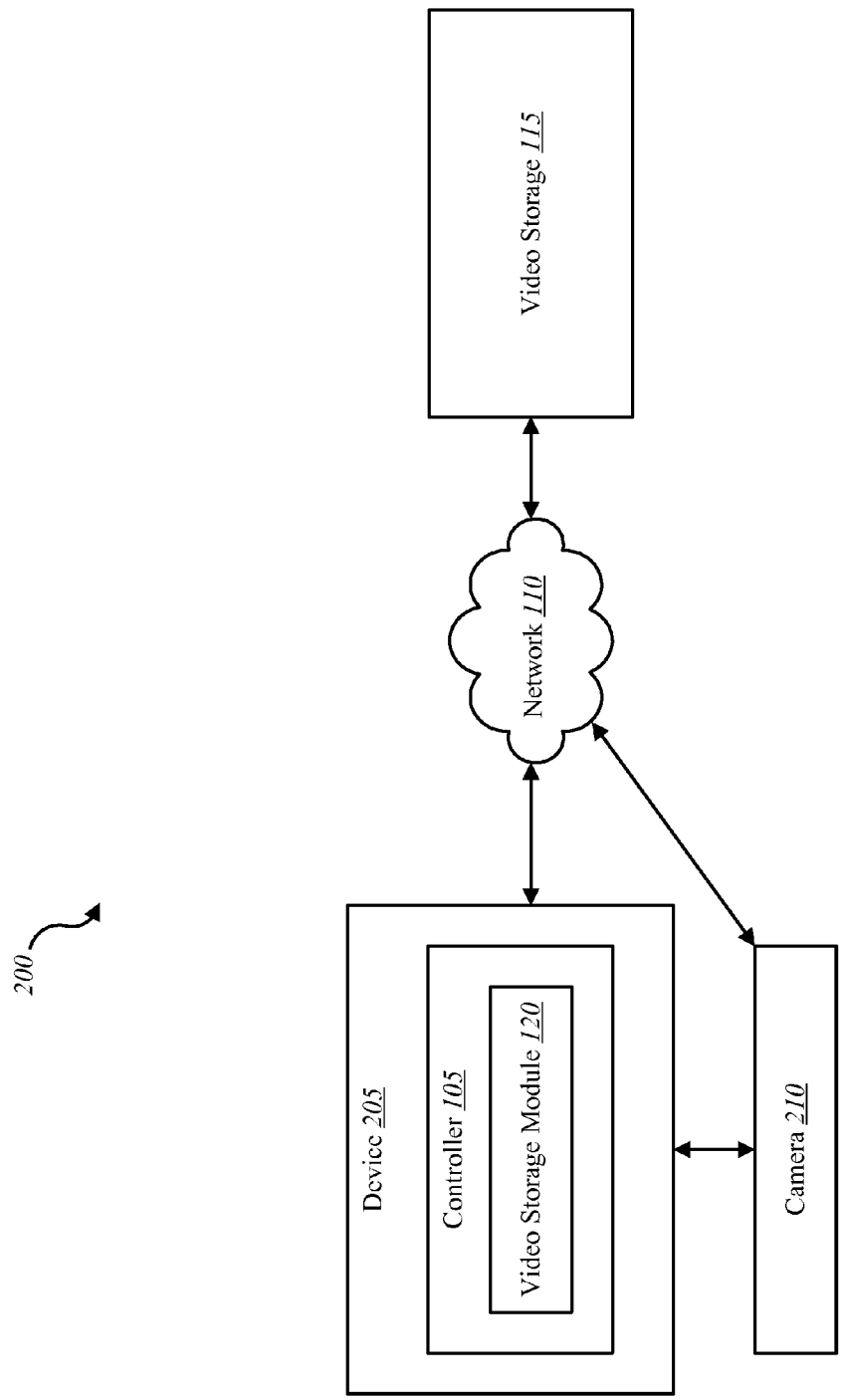
FIG. 2 is a block diagram of another environment in which the present systems and methods may be implemented.

FIG. 2 shows another environment 200 that may include the components of environment 100 described above and may further include a device 205 and a camera 210. In some embodiments, the systems and methods described herein may be performed, at least in part, using device 205. Camera 210 may be in communication with device 205 and video storage 115 via network 110. Device 205 may include, for example, a control panel of a home automation system. In other examples, device 205 may include other types of electronic devices such as, for example, a desktop computer, laptop computer, tablet computer, or handheld mobile device such as a smartphone.

Camera 210 may provide recorded video. The recorded video may be formatted as a video clip or video content associated with an event. In other examples, the recorded video may be a continuous, ongoing video recording, and video storage module 120 may operate to divide the recorded video footage into video clips/content associated with various events. The video content associated with an event may then be stored on video storage 115.

Network 110 may provide communication between device 205, video storage 115, and camera 210. Network 110 may include local area networks (LAN), wide area networks (WAN), virtual private networks (VPN), wireless networks (using 802.11, for example), and/or cellular networks (using 3G and/or LTE, for example), etc. In some embodiments, network 110 may include the Internet.

Camera 210 may include a single camera or a plurality of cameras. At least some of the cameras 210 may be connected in communication with device 205 directly or via network 110. A plurality of video clips and/or video content associated with a single event may be provided from a plurality of cameras 210. In one example, one camera has a viewing area that captures a door to a commercial freezer of a restaurant, another camera 210 has a viewing area of a cooking area of the restaurant, and a further camera 210 has a viewing area of a parking lot of a restaurant. Every time the event of the commercial freezer door being opened occurs, video content from each of the three cameras 210 (e.g., video content that covers one minute before and five minutes after the door opened) is delivered to video storage module 120. This video content may be assigned a medium or low priority indicator and stored at a location for later viewing by the store manager. The store manager may later view the video content to confirm whether a worker of the restaurant, after accessing the commercial freezer, takes the food to the cooking area for cooking or takes the food outside to his car (e.g., indicating theft of the food). If the store manager believes the video content shows that theft has occurred, the video content may be manually saved at a higher priority level in video storage 115 so that the video content is not inadvertently and/or automatically erased because of its earlier assigned low priority indicator.

The process of assigning and/or changing a priority indicator may occur automatically based on a corroboration of multiple events occurring within a given time or according to a given sequence. In the above example, if the commercial freezer door sensor indicates the freezer door has been opened, followed by opening of the restaurant side door and detected motion in the parking lot (in that order) without an intervening detected motion in the cooking area, the video content from the three cameras may be assigned a higher priority indicator as compared to priority indicators used for other sequences of events which may occur. In some embodiments, the video content from one camera may be used to validate a priority indicator assigned to video content from another camera.

Figure 3:
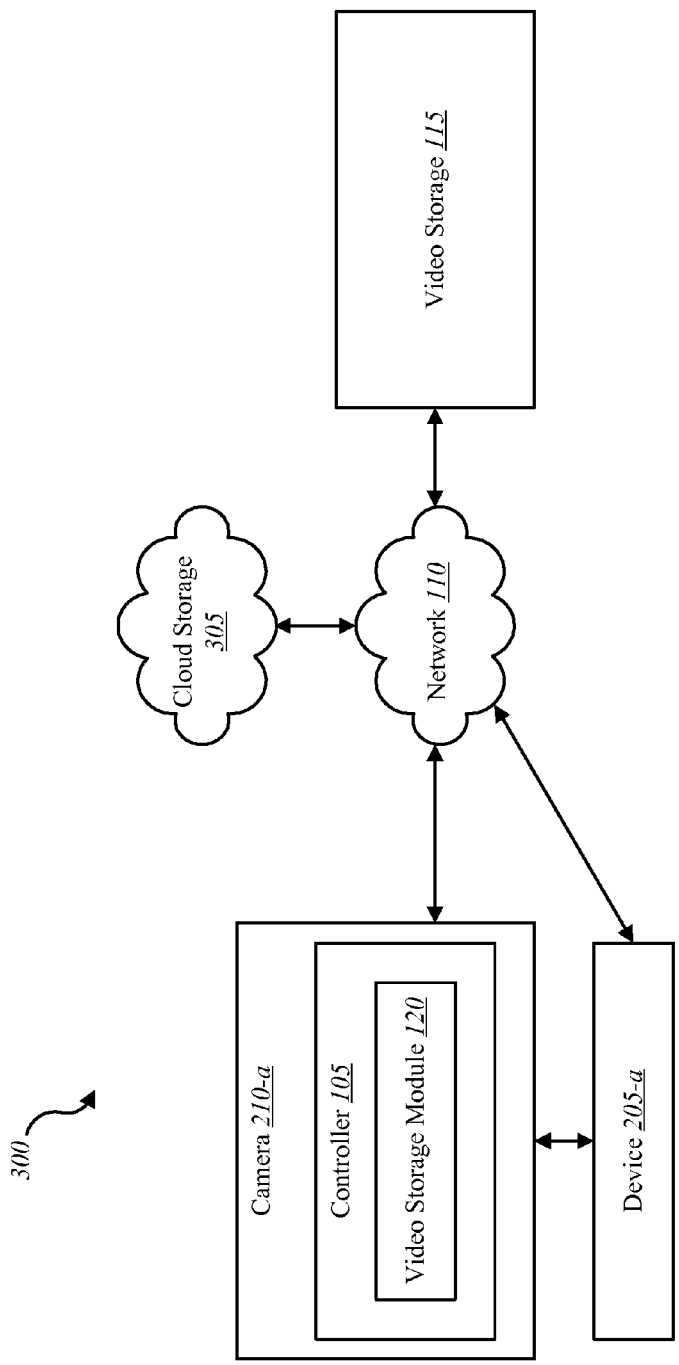
FIG. 3 is a block diagram of another environment in which the present systems and methods may be implemented.

Referring now to FIG. 3, in some embodiments, environment 300 may include at least some of the components of environments 100, 200 described above, and may further include a device 205-*a*, a camera 210-*a*, and a cloud storage 305. Camera 210-*a* may include controller 105 and video storage module 120. Device 205-*a* may communicate with camera 210-*a* directly or via network 110. Cloud storage 305 may be available for storage of at least portions of the video content via communication through network 110.

Camera 210-*a* may provide video content to video storage module 120 in the form of, for example, continuously recorded video footage or video clips associated with certain events. Video storage module 120 may operate to assign a storage location for the video content (e.g., video storage 115 and/or cloud storage 305). Video storage module 120 may also assign a priority indicator to the video content as described above. In at least some examples, the video content is routed through device 205 to video storage 115 and/or cloud storage 305.

Additionally, or alternatively, a plurality of cameras 210-*a*, each potentially having a controller 105 and video storage module 120, may be included in environment 300. Each of the cameras 210-*a* may separately and individually store video content on video storage 115 and/or cloud storage 305. In other examples, each of the cameras 210-*a* include video storage module 120, which routes the video content through device 205-*a* as part of storing the video content.

Video storage 115 may include or embody cloud storage 305. In other examples, video storage 115 may be a different type of video storage and/or different storage location for storing various types of video content and/or video content of a certain priority level. Cloud storage 305 may store other types of video content and/or video content of a particular priority level. Both video storage 115 and cloud storage 305 may be considered "remote" storage that is located either physically away from the property, building or premises that is being monitored by the home automation system, and/or at a location that is remote from a local network (e.g., neighborhood) associated with the home automation system. In other examples, at least video storage 115 is considered "local" storage and is located at the building, premises or property being monitored by the home automation system, or in a local network or neighborhood within which the home automation system operates. In one example, video storage 115 is associated with camera 210-*a*, and may be embodied within the same housing as camera 210-*a*, controller 105, and/or other components associated with camera 210-*a*. In still further examples, video storage 115 may be integrated into device 205-*a* or other components of a home automation system.

Figure 4:
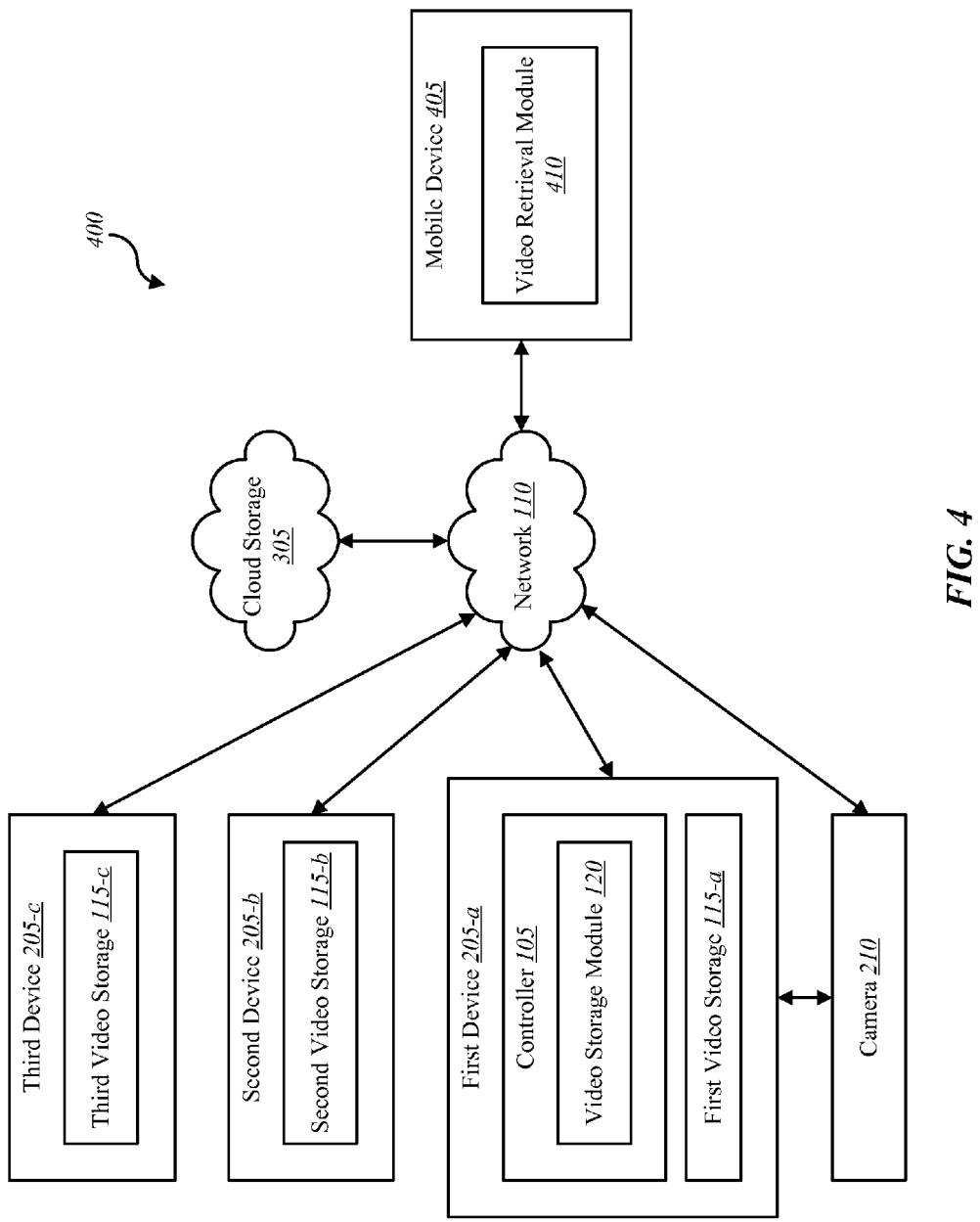
FIG. 4 is a block diagram of another environment in which the present systems and methods may be implemented.

FIG. 4 shows another environment 400 that may include at least some of the components of environments 100, 200, 300 described above and may further include a first video storage 115-*a* associated with a first device 205-*a*, a second video storage 115-*b* associated with a second device 205-*b*, and a third video storage 115-*c* associated with a third device 205-*c*. Environment 400 may also include a mobile device 405 having a video retrieval module 410.

Each of the first, second, and third devices 205 includes a video storage 115. Video storage module 120, which receives video content from at least camera 210, may assign storage of the video content to any one of the video storages 115 of devices 205. Each of video storages 115 may be part of or assigned to, for example, one or more control panels for a single home automation system. In other examples, each of the devices 205 and its associated video storage may be part of or associated with separate home automation systems (i.e., home automation systems within a local network).

Video storage 115 may be a segment or portion of a database or other data storage that is allocated exclusively for storing video content. Each of the video storages 115 may be allocated for storing video content of a certain priority indicator. In one example, the first video storage 115-*a* may store highest priority video content, with second video storage 115-*b* storing medium priority video content, and third video storage 115-*c* storing lower priority video content. Video content of any priority level may be stored in cloud storage 305. In another example, all video content is directed to first video storage 115-*a* until first video storage 115-*a* is filled, followed by storing video content on second video storage 115-*b* until filled, and followed by storage on third video storage 115-*c* until filled. Cloud storage 305 may be used for any purpose, such as storing video content after any one or all of the first, second and third video storages 115 are filled. This and many other arrangements are possible for storing video content having any priority indicator.

Mobile device 405 may be used to access at least some of the stored video content. Video retrieval module 410 may operate to access the stored video content on any one of the first, second and third video storages 115 and cloud storage 305. Mobile device 405 may include one or more processors, one or more memory devices, and/or a storage device. Although mobile device 405 is envisioned as a handheld computing device, such as a smartphone, other types of mobile devices 405 may be possible including, for example, personal computing devices, tablet computers, laptop computers, etc.

Mobile device 405 may be used to retrieve and view any desired video content based on, for example, priority indicator, event, location, or any other criteria for searching and/or selecting among various video content. The video content may include metadata that identifies various aspects of the video content (e.g., priority indicator, event, time of day, location, etc.). The metadata may be stored at the same location as the video content itself, or may be stored at a separate location (e.g., at cloud storage 305) for easier access by mobile device 405. Once the metadata is retrieved by mobile device 405, the video retrieval module 410 may reach out to any one of the video storages 115 and cloud storage 305 to obtain the desired video content. In at least some examples, the video content may be broken into fragments or segments that are stored at various locations such as any one of the video storages 115 and cloud storage 305. Video retrieval module 410 may retrieve the fragments or segments of the video content and assimilate the video content before displaying the video content to the user on mobile device 405. Video retrieval modules having similar functionality may be included on, for example, first device 205-a, camera 210, or another device associated with the home automation system that is located locally or remotely relative to a storage location of the video content and/or the location of video storage module 120.

Figure 5:
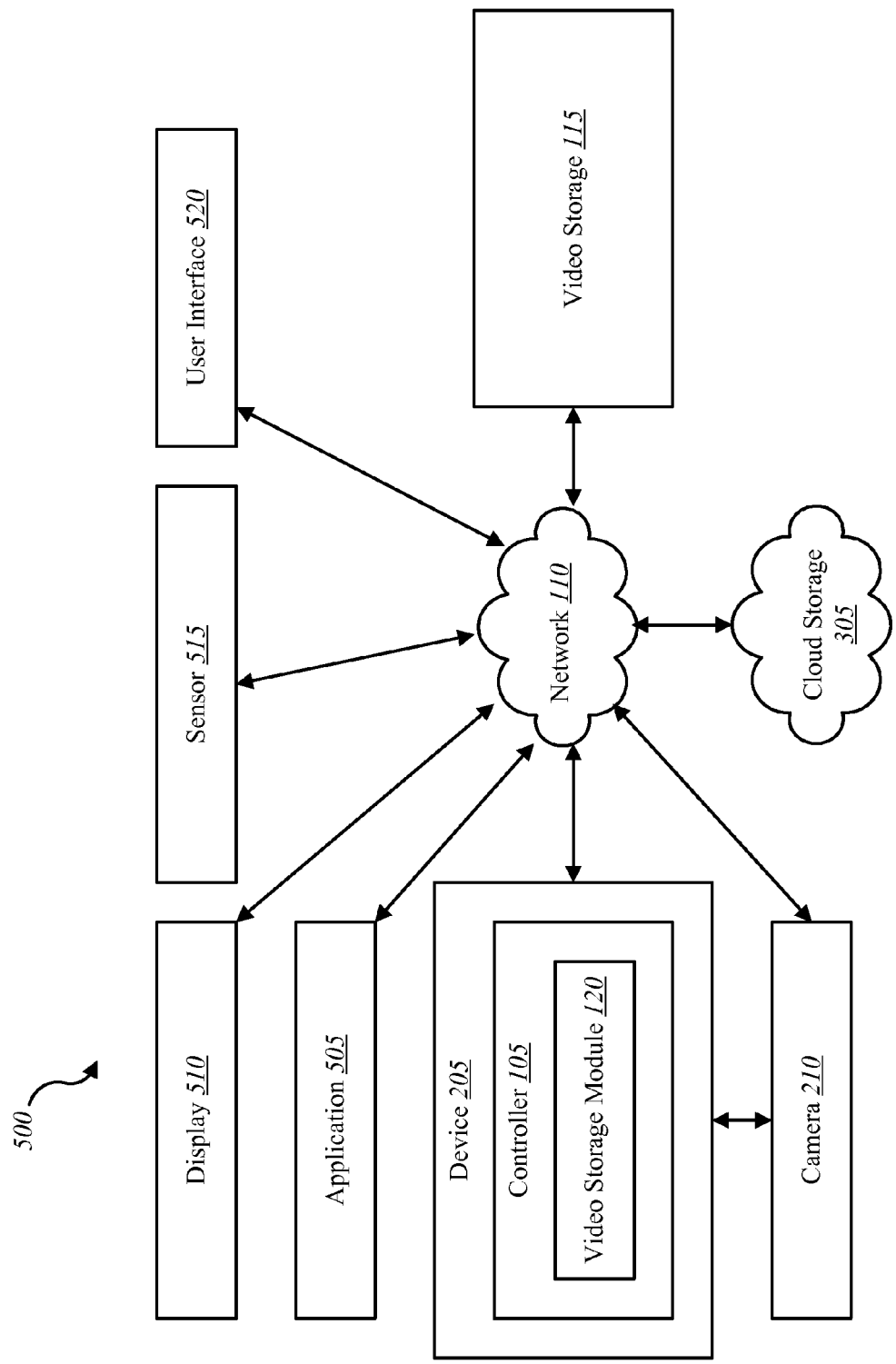
FIG. 5 is a block diagram of another environment in which the present systems and methods may be implemented.

Referring now to FIG. 5, in some embodiments, an environment 500 may include the components of any one of the environments 100, 200, 300, 400 described above. Environment 500 may additionally include application 505, display 510, sensors 515, user interface 520. Environment 500 may include, from environment 200 described above, device 205, camera 210, controller 105, network 110, video storage 115, cloud storage 305, and video storage module 120. Application 505, display 510, sensors 515, and user interface 520 may be additional components of a home automation system and may be used with any of the environments 100, 200, 300, 400 described above.

Application 505 may allow a user to control (either directly or via device 205 or controller 105) an aspect of the monitored property including security, energy management, locking and unlocking doors, checking the status of a door, locating a user or item, controlling lighting, thermostat, or cameras, and receiving notifications regarding a current status or anomaly associated with a home, office, place of business, and the like. In some configurations, application 505 may enable device 205 to interface with controller 105 and provide the user interface 520 to display automation, security, and/or energy management content on device 205 and/or mobile device 405 (see FIG. 4). Thus, application 505 via user interface 520 may allow users to control aspects of their home, office, and/or other type of property. Further, application 505 may be installed on mobile device 405, device 205, or camera 210 in order to allow a user to interface with a function of device 205, controller 105, camera 210, etc.

Display 510 may include, for example, a digital display as part of, for example, a control panel of environment 500 (e.g., a home automation system). Display 510 may be provided via devices such as, for example, a desktop computer or mobile computing device (e.g., mobile device 405). The user interface 520 may be integrated into display 510. Such a user interface 520 may include a plurality of menus, screens, microphones, speakers, cameras, and other capabilities that permit interaction between the user and the home automation system or any components of environment 500. Additionally, or alternatively, the user interface 520 with display 510 may be integrated into device 205, camera 210, controller 105, or other devices or components of environment 500.

Sensor 515 may include, for example, a camera sensor, an audio sensor, a forced-entry sensor, a shock sensor, a proximity sensor, a boundary sensor, an appliance sensor, a light fixture sensor, a temperature sensor, a light beam sensor, a three-dimensional (3D) sensor, a motion sensor, a smoke sensor, a glass break sensor, a door sensor, a video sensor, a carbon monoxide sensor, an accelerometer, a global positioning system (GPS) sensor, a Wi-Fi positioning sensor, a capacitate sensor, a radio frequency sensor, a near-field sensor, a heartbeat sensor, a breathing sensor, an oxygen sensor, a carbon dioxide sensor, a brain wave sensor, a motion sensor, a voice sensor, a touch sensor, and the like. The cameras may include video and still shot images and may be part of or integrated into camera 210. Camera 210 may include or have integrated therein one or more of the sensors 515. Although sensor 515 is depicted as connected to device 205, camera 210, video storage 115, and cloud storage 305 via network 110, in some embodiments, sensor 515 may be connected directly to any one of those components. Additionally, or alternatively, sensor 515 may be integrated into a home appliance or fixture such as a light bulb fixture.

Sensor 515 may include an accelerometer to enable sensor 515 to detect motion or movement of a user. Sensor 515 may include a wireless communication device, which enables sensor 515 to send and receive to and from one or more devices in environment 500. Additionally, or alternatively, sensor 515 may include a GPS sensor to enable sensor 515 to track the location of sensor 515. Sensor 515 may include a proximity sensor to enable sensor 515 to detect proximity of the user relative to a predetermined distance from a boundary (e.g., geo-fence). Sensor 515 may include one or more security detection sensors such as, the glass break sensor, motion detection sensor, or both described above. Additionally, or alternatively, sensor 515 may be operable to detect the presence of a user within a dwelling or in close proximity to a dwelling that is monitored by the home automation system, perform certain functions (e.g., opening or closing a door or window), or speaking in voice command. The information provided by sensor 515 may be used to generate or identify an event for the purposes of creating a video clip or other video content and/or assigning a priority indicator to certain video content.

In any of the environments 100, 200, 300, 400, 500 described herein, certain video content with the highest assigned priority may immediately be stored in the cloud storage or other remote storage location in order to ensure that the video content is preserved and kept from damage. In one example, the event associated with the video content is unauthorized entry into a home (e.g., determined by, for example, a glass break sensor, a door opening sensor, a motion detection sensor, etc.). At least some of the video content collected by camera 210 in and/or around the home (e.g., in a room where sensors indicate the unauthorized entry occurred) just prior to, during, and/or after the entry is immediately transferred to the cloud storage or other remote storage location to preserve the video content in the event someone (e.g., a burglar) intentionally damages the camera, device 205 (e.g., control panel), or any other device that houses the controller (controller 105) and/or original video content. In at least some embodiments, the possible events that occur at a property and are identified by the home automation system as having the highest priority value may be stored remotely, while low priority video content may be stored locally. In some examples, the metadata (e.g., assigned priority level) of low priority video content may be stored remotely while the video content itself is stored locally. In at least some examples, the metadata is stored for longer periods of time than the video content itself.

Figure 6:
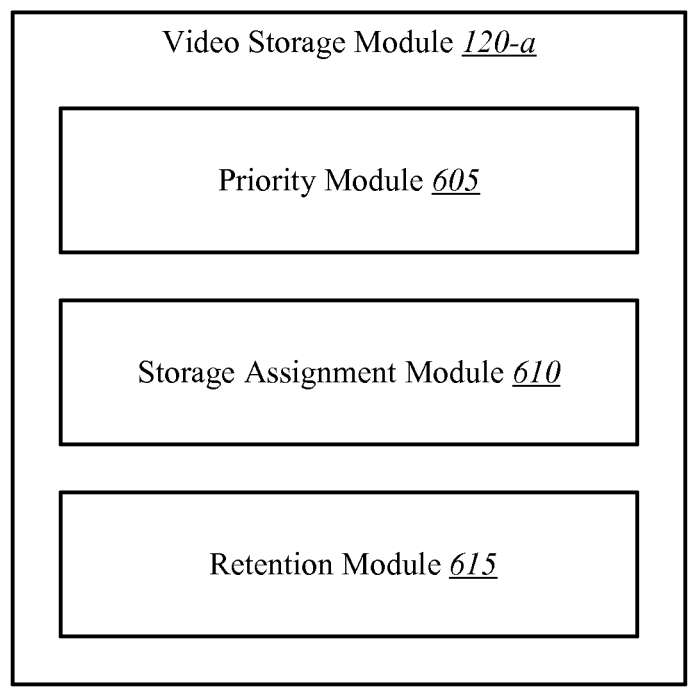
FIG. 6 is a block diagram of a video storage module for use in at least one of the environments shown in FIG. 1-5.

FIG. 6 shows an example video storage module 120-a. Video storage module 120-a may be one example of the video storage module 120 shown in any of FIGS. 1-5. Video storage module 120-*a* may include a priority module 605, a storage assignment module 610, and a retention module 615. Priority module 605 may operate to assign a priority indicator to video content based at least in part on, for example, one or more rules or criteria that is set up for assigning such priority indicators. The rules or criteria may be based at least in part on a type of event, a location, time of day, a repeated event, etc. detected by a home automation system. The priority assigned may take many forms, including, for example, low, medium, high indicators, a number value of 1-4 or 1-10, or an indicator associated with an amount of time the video content is stored (e.g., short-term, long-term, permanent, etc.).

Storage assignment module 610 may operate to store the video content in any one (or more) of a plurality of different locations. In at least some examples, at least two separate storage locations may be available for storing video content. The storage locations may be segments or portions of a single database or storage device. In other examples, the storage locations are separate databases or storage devices. The storage devices may be located remotely or locally relative to the camera, video storage module, and/or home automation system and its components.

Retention module 615 may separately assign or associate a time period for retention of the video content in storage. Retention module 615 may indicate an amount of time that the video content should be stored for purposes of, for example, automatically deleting the video content from its stored location. For example, retention module 615 may tag or otherwise assign a retention period for any given video content in the amount of, for example, one hour, one day, one week, one month, or permanent storage. In at least some examples, the functions of retention module 615 may be combined or used concurrently with operation of priority module 605 and/or storage assignment module 610.

The priority module 605, storage assignment module 610, and retention module 615 may operate independently or cooperatively as part of operation of video storage module 120-*a*. In some examples, video storage module 120-*a* may include any one or a combination of priority module 605, storage assignment module 610, retention module 615, and other modules, features, and functionality.

Figure 7:
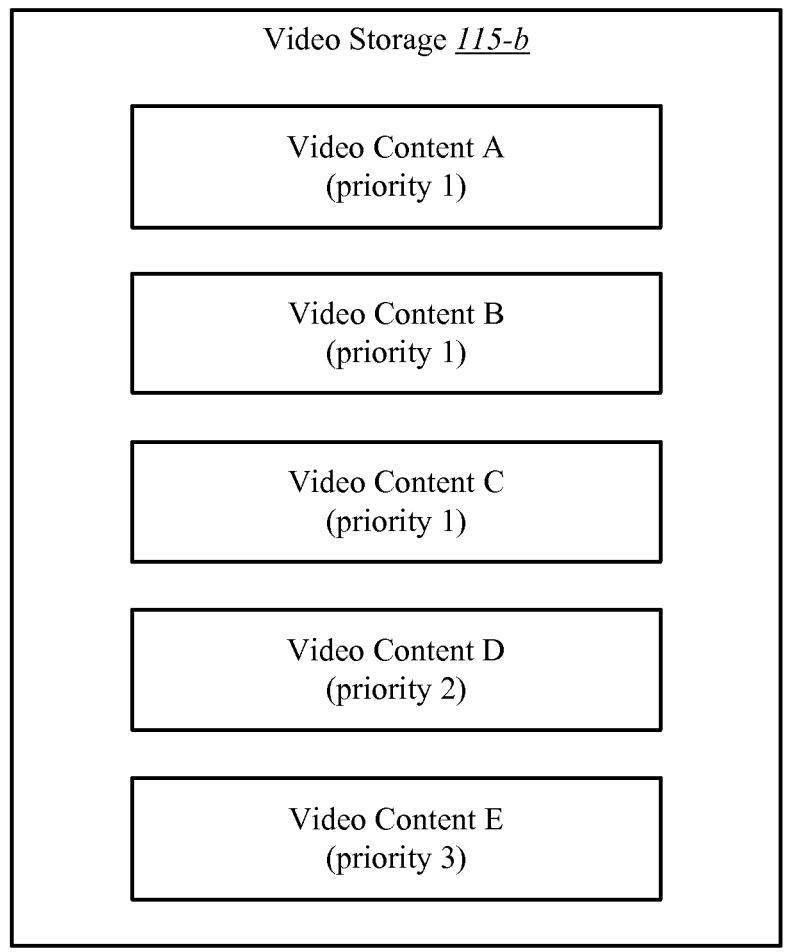
FIG. 7 is a block diagram of a video storage for use in at least one of the environments shown in FIG. 1-5.

FIG. 7 shows an example video storage 115-*b*, which may be one example of the video storage 115 shown in FIGS. 1-5. Video storage 115-*b* may include capability to store a plurality of video content (video content A-E). Each of the video content may have assigned thereto a priority indicator (priority 1-3). The video content A-E may be searched based at least in part on the priority indicator. Video content A-E may be stored for a certain amount of time based on the priority indicator. The video content A-E may be stored at various locations within video storage 115-*b* based at least in part on the priority indicator.

Figure 8:
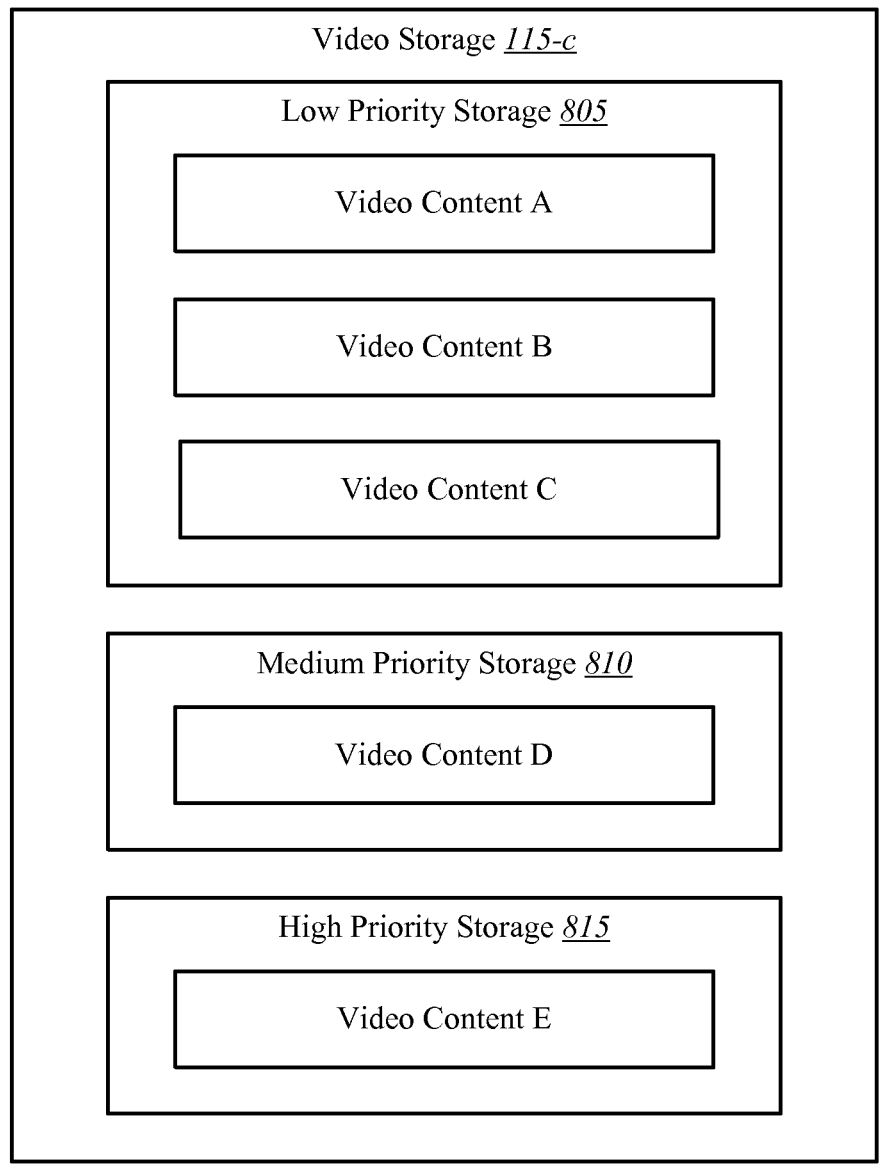
FIG. 8 is a block diagram of another video storage for use in at least one of the environments shown in FIG. 1-5.

Referring to FIG. 8, another video storage 115-*c* is shown. Video storage 115-*c* may be one example of the video storage 115 shown in FIGS. 1-5. Video storage 115-*c* includes a low priority storage segment 805, a medium priority storage segment 810, and a high priority storage segment 815. All video content (video content A-C) having assigned thereto a low priority value may be stored in low priority storage segment 805. Video content D, which has assigned thereto a medium priority level, is assigned to medium priority storage segment 810. Video content E, which has a high priority assigned thereto, is stored in high priority storage segment 815.

Video storage 115-*c* may include more or fewer storage segments than those shown in FIG. 8. Each storage segment may have the capacity to store one or more video content, wherein each video content may be associated with an event or meet other criteria as assignment by, for example, video storage module 120 discussed with reference to FIGS. 1-6.

Figure 9:
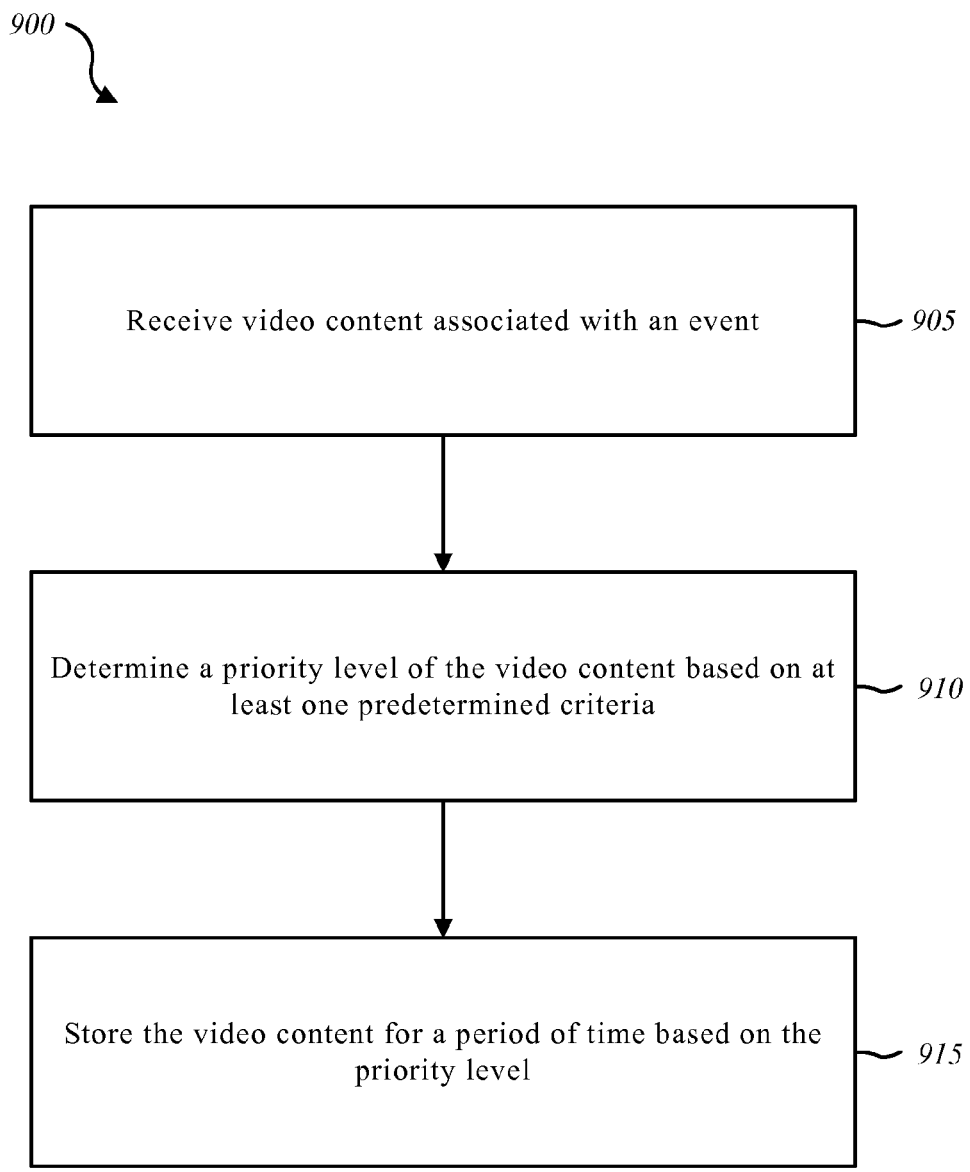
FIG. 9 is a flow diagram illustrating a method for storing video content collected by a home automation system.

FIG. 9 is a flow diagram illustrating one embodiment of a method 900 for storing video content collected by a home automation system. In some configurations, the method 900 may be implemented with any of the video storage modules 120 shown in FIGS. 1, 2, 3, 4, 5 and/or 6. In other examples, method 900 may be performed generally by controller 105 shown in FIGS. 1-5, or even more generally by the environments 100, 200, 300, 400, 500 shown in FIGS. 1-5.

At block 905, method 900 includes receiving recorded video of an event. At block 910, method 900 includes determining a priority level of a recorded video based on at least one predetermined criteria. Block 915 includes storing the recorded video for a period of time based on the priority level.

Method 900 may also include storing a recorded video in one of cloud storage and local storage. Method 900 may include identifying the event based on at least one criteria and collecting video for a predetermined amount of time, for example, prior to and after the event is identified. Method 900 may include deleting the recorded video at the end of the period of time. The period of time may range from less than 24 hours to permanent storage. Method 900 may include determining a storage location for the recorded video based at least in part on the priority level assigned to the recorded video. Method 900 may include permitting a user to manually adjust the priority level. Method 900 may include correlating the video content with other video content to confirm accuracy of determined priority level.

Figure 10:
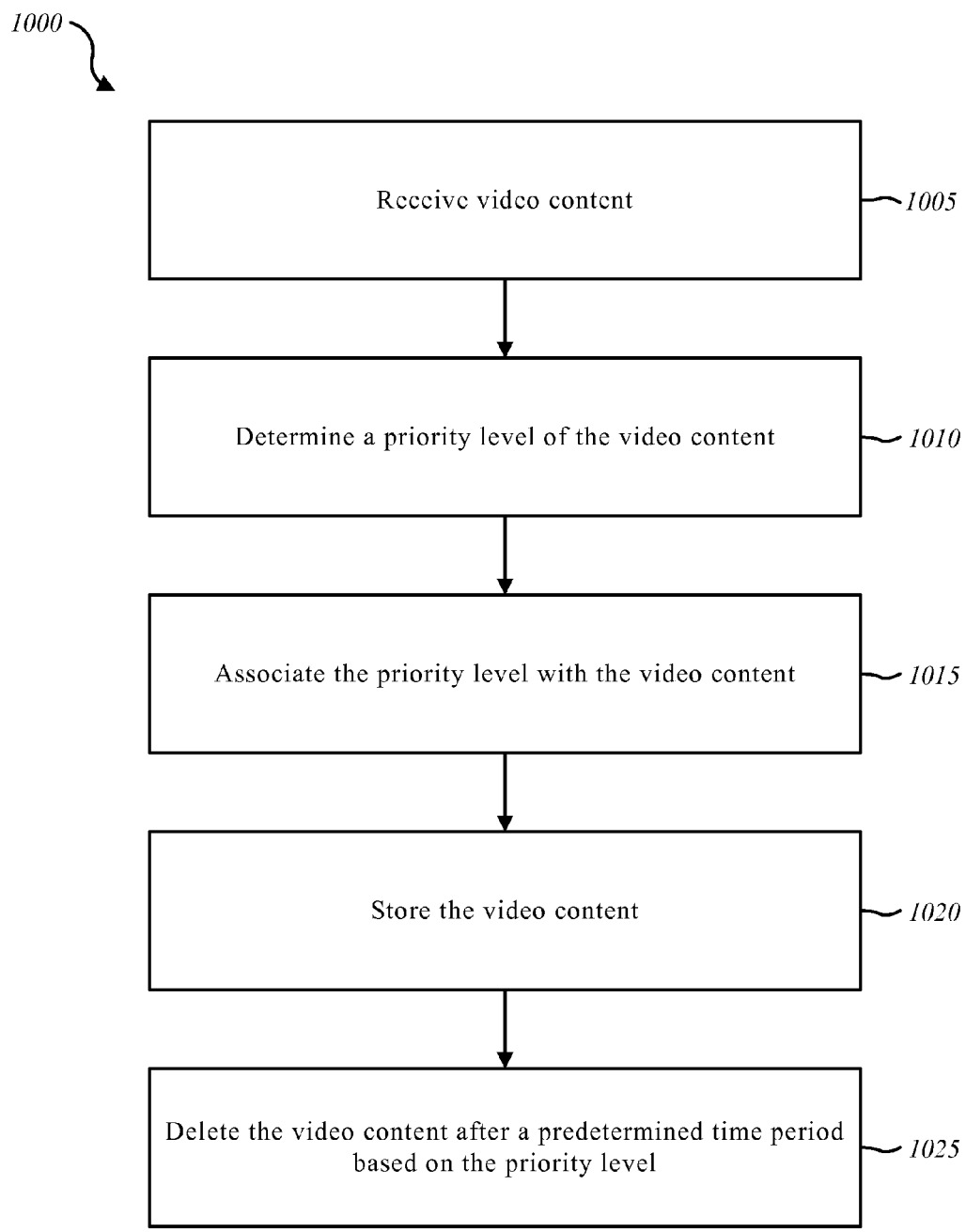
FIG. 10 is a flow diagram illustrating another method for storing video content collected by a home automation system.

FIG. 10 is a flow diagram illustrating one embodiment of a method 1000 for storing video content collected by a home automation system. In some configurations, the method 1000 may be implemented by any one of the video storage modules 120 described with reference to FIGS. 1-5. In other examples, method 1000 may be performed generally by controller 105 shown in FIGS. 1-5 or even more generally by the environments 100, 200, 300, 400, 500 shown in FIGS. 1-5.

At block 1005, method 1000 includes receiving recorded video content. Block 1010 includes determining a priority level of the video content. Block 1015 includes associating the priority level with the video content. At block 1020, method 1000 includes storing the video content. Block 1025 includes deleting the video content after a predetermined time period based on the priority level.

Receiving the recorded video content may include receiving video content from a video camera. Determining a priority level for the video content may include determining whether the video content meets predetermined criteria. Storing the video content may include storing to one of a plurality of storage locations based on the priority level. Each storage location may have a different time period associated therewith for deleting the video content. The predetermined time period may include at least two different time periods.

Figure 11:
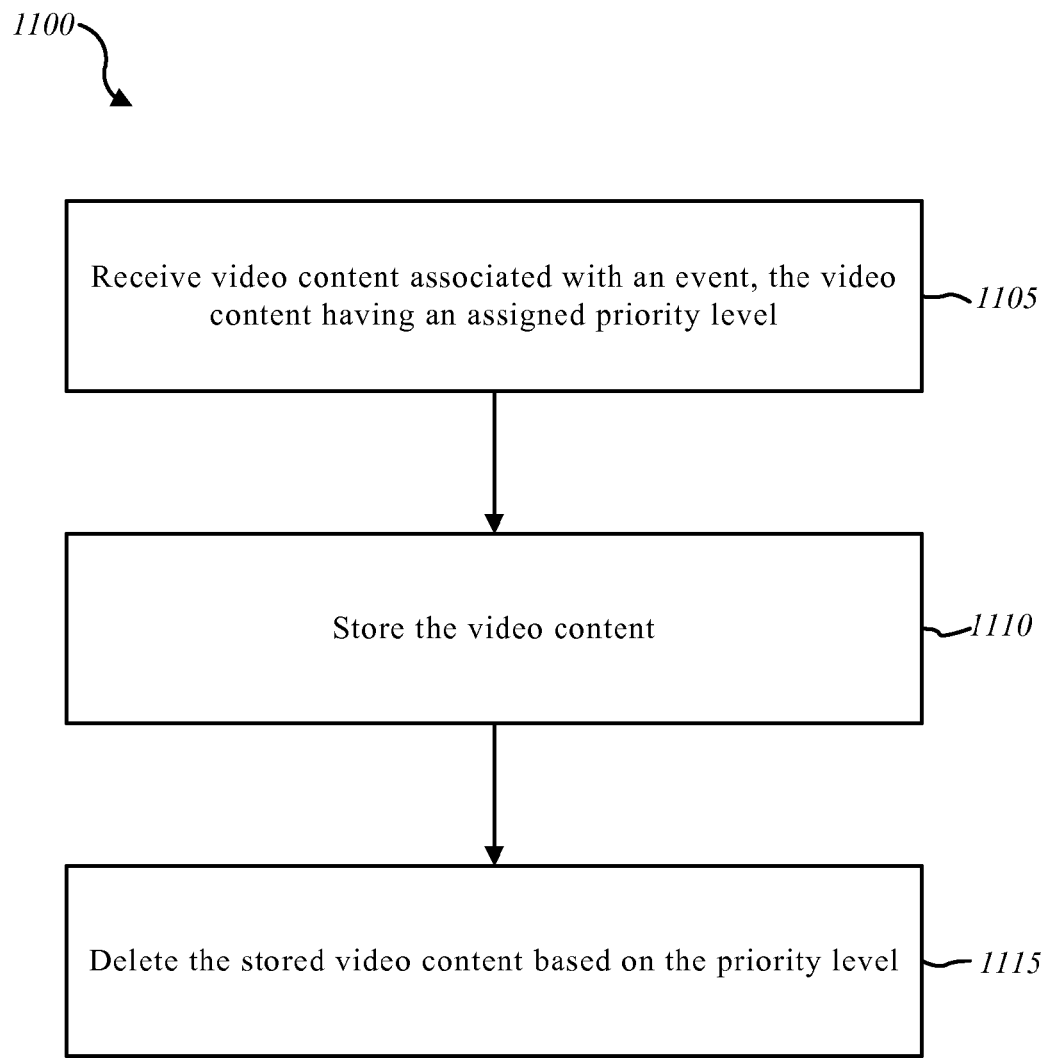
FIG. 11 is a flow diagram illustrating another method for storing video content collected by a home automation system.

FIG. 11 is a block diagram illustrating one example of a method 1100 for storing video content collected by a home automation system. In some configurations, the method 1100 may be implemented by the video storage modules 120 described with reference to FIGS. 1-5. In other examples, method 1100 may be performed generally by controller 105 or device 205 shown in FIGS. 1-5, or even more generally by the environments 100, 200, 300, 400, 500 shown in FIGS. 1-5.

At block 1105, method 1100 includes receiving video content of an event, wherein the video content has an assigned priority level. Block 1110 includes storing the video content. Block 1115 includes deleting the stored video content based on the priority level.

Method 1100 may provide storing the video content by storing at different locations based on the priority level. Method 1100 may include automatically assigning a priority level to the video content based on predetermined criteria. Method 1100 may include identifying an event and creating a video clip of recorded video associated with the event, wherein the video content includes the video clip. Receiving the video content may include receiving video content at a control panel of the home automation system. The event may include at least one of sensing motion, opening a barrier into a building structure, operating lighting, breaking glass, operating a garage door, and operating a home appliance.

Figure 12:
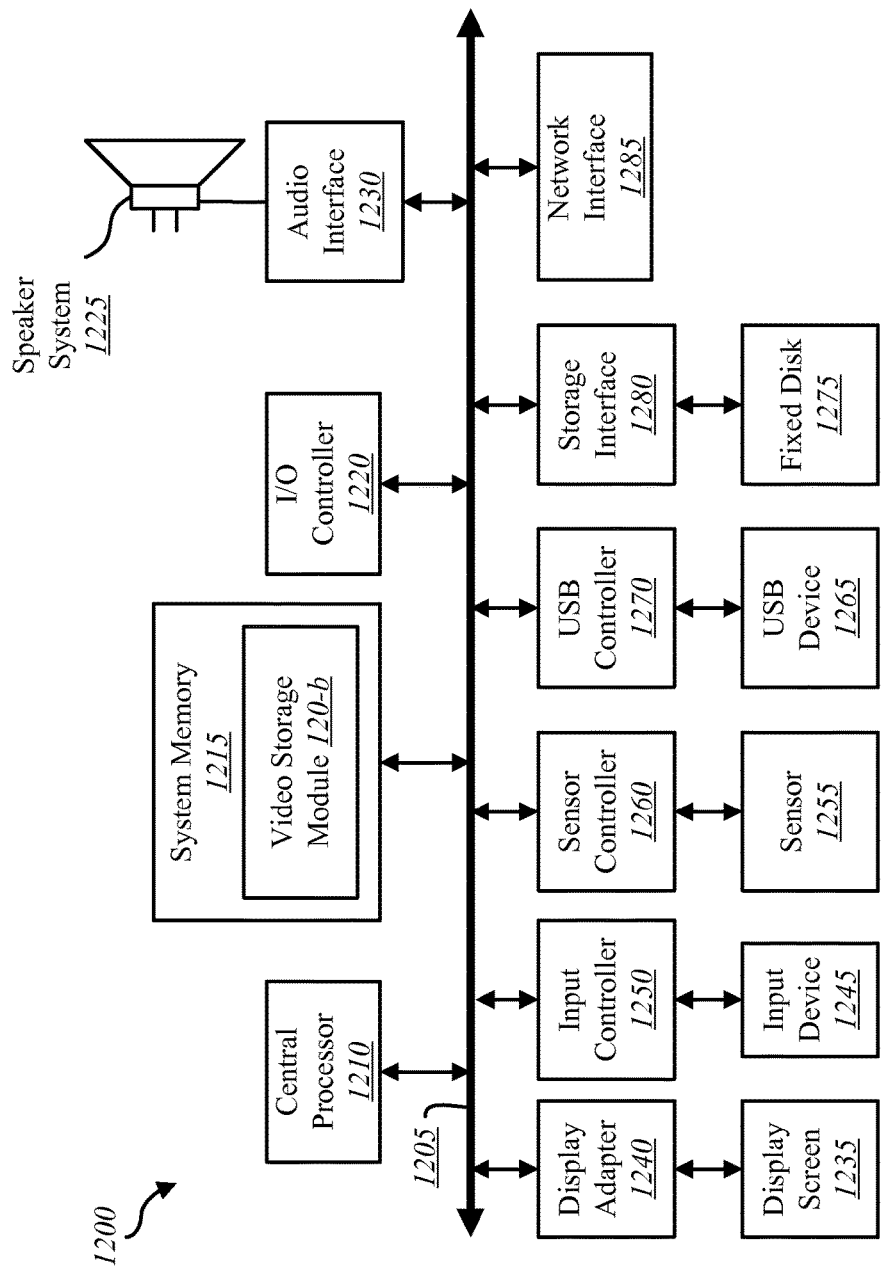
FIG. 12 is a block diagram of a computer system suitable for implementing the present systems and methods of FIGS. 1-11.

FIG. 12 depicts a block diagram of a controller 1200 suitable for implementing the present systems and methods. The controller 1200 may be an example of the controller 105 of device 205 and camera 210 illustrated in FIGS. 2, 3, 4 and/or 5. In one configuration, controller 1200 includes a bus 1205 which interconnects major subsystems of controller 1200, such as a central processor 1210, a system memory 1215 (typically RAM, but which may also include ROM, flash RAM, or the like), an input/output controller 1220, an external audio device, such as a speaker system 1225 via an audio output interface 1230, an external device, such as a display screen 1235 via display adapter 1240, an input device 1245 (e.g., remote control device interfaced with an input controller 1250), multiple USB devices 1265 (interfaced with a USB controller 1270), and a storage interface 1280. Also included are at least one sensor 1255 connected to bus 1205 through a sensor controller 1260 and a network interface 1285 (coupled directly to bus 1205).

Bus 1205 allows data communication between central processor 1210 (e.g., controller 105) and system memory 1215, which may include read-only memory (ROM) or flash memory (neither shown), and random access memory (RAM) (not shown), as previously noted. Any of the modules discloses with reference to FIGS. 1-5 may be stored in system memory 1215. The RAM is generally the main memory into which the operating system and application programs are loaded. The ROM or flash memory can contain, among other code, the Basic Input-Output system (BIOS) which controls basic hardware operation such as the interaction with peripheral components or devices. Applications (e.g., application 505) resident with controller 1200 are generally stored on and accessed via a non-transitory computer readable medium, such as a hard disk drive (e.g., fixed disk 1275) or other storage medium. Additionally, applications can be in the form of electronic signals modulated in accordance with the application and data communication technology when accessed via interface 1285.

Storage interface 1280, as with the other storage interfaces of controller 1200, can connect to a standard computer readable medium for storage and/or retrieval of information, such as a fixed disk drive 1275. Fixed disk drive 1275 may be a part of controller 1200 or may be separate and accessed through other interface systems. Network interface 1285 may provide a direct connection to a remote server via a direct network link to the Internet via a POP (point of presence). Network interface 1285 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1200 wirelessly via network interface 1285.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 12 need not be present to practice the present systems and methods. The devices and subsystems can be interconnected in different ways from that shown in FIG. 12. The aspect of some operations of a system such as that shown in FIG. 12 are readily known in the art and are not discussed in detail in this application. Code to implement the present disclosure can be stored in a non-transitory computer-readable medium such as one or more of system memory 1215 or fixed disk 1275. The operating system provided on controller 1200 may be iOS®, ANDROID®, MS-dOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An apparatus for storing video content collected by an automation system, comprising:
    a processor;
    a memory in electronic communication with the processor; and
    instructions stored in the memory, the instructions being executable by the processor to:
        identify an event based on at least one criteria and collect video content for a predetermined amount of time prior to and after the identified event;
        receive, by a video storage module, the collected video content associated with the event based at least in part on the event occurring;
        determine, by a priority module, a priority level of the video content based at least in part on at least one predetermine criteria;
        determine, by a storage assignment module, a storage location for the video content based at least in part on the determined priority level assigned to the video content, wherein the storage location comprises at least one of a storage database of a plurality of storage database or a partition of a plurality of partitions of a storage database;
        store the video content at the determined storage location for a period of time based at least in part on the determined priority level;
        retrieve, by a video retrieval module, the video content from the determined storage location for display; and
        permit a user, by a control panel, to review the retrieved video content and manually override the determined priority level and adjust the determined storage location.

2. The apparatus of claim 1, wherein the storage location further comprises:
    cloud storage or local storage.

3. The apparatus of claim 1, wherein the instructions are executable by the processor to:
    delete the video content at an end of the period of time.

4. The apparatus of claim 1, wherein the period of time ranges from less than 24 hours to permanent storage, wherein the permanent storage comprises storing the video content until the video content is manually deleted.

5. The apparatus of claim 1, wherein permitting the user to manually adjust the determined priority level occurs before deleting the video content.

6. The apparatus of claim 1, wherein the instructions are executable by the processor to:
    correlate the video content with other video content to confirm an accuracy of the determined priority level.

7. The apparatus of claim 1, further comprising:
    assigning the priority level to the video content based at least in part on predetermined criteria.

8. The apparatus of claim 1, wherein the event includes at least one of sensing a motion, opening a barrier into a structure, operating lighting, breaking glass, operating a garage door, or operating a home appliance.

9. A computer-program product for storing video content collected by an automation system, the computer-program product comprising a non-transitory computer-readable medium storing instructions executable by a processor to:
    identify an event based on at least one criteria and collect video content for a predetermined amount of time prior to and after the identified event;
    receive, by a video storage module, the collected video content associated with the event based at least in part on the event occurring;
    determine, by a priority module, a priority level of the video content;
    determine, by a storage assignment module, a storage location for the video content based at least in part on the determined priority level assigned to the video content, wherein the storage location comprises at least one of a storage database of a plurality of storage databases or a partition of a plurality of partitions of a storage database;
    store the video content at the determined storage location;
    retrieve, by a video retrieval module, the video content from the determined storage location for display;
    permit a user, by a control panel, to review the retrieved video content and manually override the determined priority level and adjust the determined storage location; and
    delete, by a retention module, the video content from the determined storage location after a predetermined time period based at least in part on the determined priority level or the manually overridden priority level.

10. The computer-program product of claim 9, wherein the instructions executable by the processor to receive the video content are further executable by the processor to:
    receive video content from a video camera.

11. The computer-program product of claim 9, wherein the instructions executable by the processor to determine a priority level of the video content are further executable by the processor to:
    determine whether the video content meets predetermined criteria.

12. The computer-program product of claim 9, wherein each storage database or partition of a storage database has a different time period associated therewith for deleting the video content.

13. The computer-program product of claim 9, wherein the predetermined time period includes at least two different time periods.

14. A computer-implemented method for storing video content collected by an automation system, comprising:
- identifying an event based on at least one criteria and collecting video content for a predetermined amount of time prior to and after the identified event;
- receiving, by a video storage module, the collected video content associated with the event based at least in part on the event occurring;
- assigning, by a priority module, a priority level to the video content;
- determining, by a storage assignment module, a storage location for the video content based at least in part on the priority level assigned to the video content, wherein the storage location comprises at least one of a storage database of a plurality of storage databases or a partition of a plurality of partitions of storage database;
- storing the video content at the determined storage location;
- retrieving, by a video retrieval module, the video content from the determine storage location for display;
- permitting a user, by a control panel, to review the retrieved video content and manually override the determined priority level and adjust the determined storage location; and
- deleting, by a retention module, the stored video content from the determined storage location based at least in part on the priority level.

15. The method of claim 14, wherein storing the video content further comprises:
- storing the video content in different locations based at least in part on the priority level.

16. The method of claim 14, further comprising:
- automatically assigning the priority level to the video content based at least in part on predetermined criteria.

17. The method of claim 14, further comprising:
- creating a video clip of recorded video associated with the event, the video content including the video clip.

18. The method of claim 14, wherein receiving video content comprises:
- receiving the video content at a control panel of the automation system.

19. The method of claim 14, wherein the event includes at least one of sensing motion, opening a barrier into a building structure, operating lighting, breaking glass, operating a garage door, and operating a home appliance.

* * * * *